US012697581B2

(12) United States Patent
Han et al.

(10) Patent No.: US 12,697,581 B2
(45) Date of Patent: Aug. 4, 2026

(54) PRESSURE SWING ADSORPTION APPARATUS FOR HIGH PURITY HYDROGEN PURIFICATION FROM AMMONIA DECOMPOSITION AND HYDROGEN PURIFICATION METHOD USING THE SAME

(71) Applicant: KOREA INSTITUTE OF ENERGY RESEARCH, Daejeon (KR)

(72) Inventors: Sang-sup Han, Daejeon (KR); Hyung-chul Yoon, Daejeon (KR); Hee-tae Beum, Daejeon (KR); Kanghee Cho, Daejeon (KR); Sun Hyung Kim, Daejeon (KR); Hyung Kuk Ju, Jeonju-si (KR); Jae Hyung Kim, Daejeon (KR); Kyungho Lee, Daejeon (KR); Jong-ho Park, Daejeon (KR); Jong-nam Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 321 days.

(21) Appl. No.: 18/263,270

(22) PCT Filed: May 17, 2023

(86) PCT No.: PCT/KR2023/006696
§ 371 (c)(1),
(2) Date: Jul. 27, 2023

(87) PCT Pub. No.: WO2024/143722
PCT Pub. Date: Jul. 4, 2024

(65) Prior Publication Data
US 2025/0001352 A1     Jan. 2, 2025

(30) Foreign Application Priority Data
Dec. 30, 2022    (KR) ........................ 10-2022-0190622

(51) Int. Cl.
*B01D 53/047* (2006.01)
*B01D 53/04* (2006.01)
(Continued)

(52) U.S. Cl.
CPC ..... *B01D 53/0476* (2013.01); *B01D 53/0423* (2013.01); *B01D 53/0446* (2013.01);
(Continued)

(58) Field of Classification Search
CPC ............ B01D 53/0476; B01D 53/0423; B01D 53/0446; B01D 53/261; B01D 2253/102;
(Continued)

(56) References Cited

U.S. PATENT DOCUMENTS 3,986,849 A    10/1976  Fuderer et al.
4,326,858 A     4/1982  Benkmann
(Continued)

FOREIGN PATENT DOCUMENTS

EP        0234895 A2    9/1987
JP        S54126689 A    10/1979
(Continued)

*Primary Examiner* — Dung H Bui
(74) *Attorney, Agent, or Firm* — Rabin & Berdo, P.C.

(57)        ABSTRACT

The present disclosure relates to a pressure swing adsorption apparatus for high purity hydrogen purification from ammonia decomposition and a hydrogen purification method using the same, and more specifically, the pressure swing adsorption apparatus includes a plurality of adsorption towers including a guard bed unit and a hydrogen purification unit, in which each adsorption tower is packed with different adsorbents, to purify high purity hydrogen from mixed hydrogen gas produced after ammonia decomposition, make it easy to replace the adsorbent for ammonia removal, minimize the likelihood that the lifetime of the adsorbent in the hydrogen purification unit is drastically reduced by trace amounts of ammonia, efficiently recover hydrogen of the (Continued)

guard bed unit, thereby maximizing the hydrogen recovery rate compared to a conventional pressure swing adsorption process including a pretreatment unit and a hydrogen purification unit, and respond to a large change in ammonia concentration in the raw material.

5 Claims, 2 Drawing Sheets

(51) Int. Cl.
| | |
|---|---|
| *B01D 53/26* | (2006.01) |
| *C01B 3/047* | (2026.01) |
| *C01B 3/56* | (2006.01) |

(52) U.S. Cl.
CPC ............ *B01D 53/261* (2013.01); *C01B 3/047* (2013.01); *C01B 3/56* (2013.01); *B01D 2253/102* (2013.01); *B01D 2253/104* (2013.01); *B01D 2253/106* (2013.01); *B01D 2253/108* (2013.01); *B01D 2253/25* (2013.01); *B01D 2256/16* (2013.01); *B01D 2257/102* (2013.01); *B01D 2257/406* (2013.01); *B01D 2257/80* (2013.01); *B01D 2259/40016* (2013.01); *B01D 2259/40018* (2013.01); *B01D 2259/40037* (2013.01); *B01D 2259/40039* (2013.01); *B01D 2259/40052* (2013.01); *B01D 2259/40071* (2013.01); *B01D 2259/40075* (2013.01); *B01D 2259/4067* (2013.01); *B01D 2259/4068* (2013.01); *B01D 2259/4146* (2013.01); *C01B 2203/0266* (2013.01); *C01B 2203/043* (2013.01); *C01B 2203/0495* (2013.01)

(58) Field of Classification Search
CPC ........ B01D 2253/104; B01D 2253/106; B01D 2253/108; B01D 2253/25; B01D 2256/16; B01D 2257/102; B01D 2257/406; B01D 2257/80; B01D 2259/40016; B01D 2259/40018; B01D 2259/40037; B01D 2259/40039; B01D 2259/40052; B01D 2259/40071; B01D 2259/40075; B01D 2259/4067; B01D 2259/4068; B01D 2259/4146; B01D 2253/1122; B01D 2259/402; B01D 2259/4145; B01D 53/047; B01D 53/02; B01D 53/0454; C01B 3/047; C01B 3/56; C01B 2203/0266; C01B 2203/043; C01B 2203/0495; C01B 2203/042; Y02E 60/36

See application file for complete search history.

(56) References Cited

U.S. PATENT DOCUMENTS

| | | | | |
|---|---|---|---|---|
| 4,914,076 | A * | 4/1990 | Tsuji ................... | B01J 20/0288 502/415 |
| 5,250,088 | A | 10/1993 | Yamaguchi et al. | |
| 5,997,829 | A * | 12/1999 | Sekine ................... | B01D 53/02 423/230 |
| 8,778,051 | B2 | 7/2014 | Weist, Jr. et al. | |
| 9,381,460 | B2 | 7/2016 | Weist, Jr. et al. | |
| 2005/0098034 | A1 | 5/2005 | Gittleman | |
| 2018/0169561 | A1* | 6/2018 | Jonnavittula ....... | C01B 21/0466 |
| 2019/0284052 | A1* | 9/2019 | Ostuni .................. | C01C 1/0405 |
| 2020/0231435 | A1* | 7/2020 | Zhou ...................... | C01B 3/366 |
| 2020/0368667 | A1* | 11/2020 | Obata .................. | B01J 20/3458 |
| 2020/0368669 | A1 | 11/2020 | Applegarth et al. | |
| 2021/0031171 | A1* | 2/2021 | Stephenson ........ | B01J 20/28011 |
| 2022/0298430 | A1* | 9/2022 | Roy ......................... | C10G 3/50 |
| 2022/0401872 | A1* | 12/2022 | Shah .................. | B01D 53/0407 |
| 2023/0131407 | A1* | 4/2023 | Khy ........................... | C25B 1/04 205/349 |
| 2023/0167748 | A1* | 6/2023 | Roesch ................... | F01K 3/188 290/2 |
| 2023/0271829 | A1* | 8/2023 | Christensen ........... | C01B 3/382 423/652 |
| 2024/0100469 | A1* | 3/2024 | Yoon ......................... | C01B 3/56 |
| 2024/0279053 | A1* | 8/2024 | White ................. | B01D 53/047 |

FOREIGN PATENT DOCUMENTS

| | | | |
|---|---|---|---|
| JP | 60-5419 | U | 1/1985 |
| JP | 01-246103 | A | 10/1989 |
| JP | 2018-177615 | A | 11/2018 |
| KR | 20010076171 | A | 8/2001 |
| KR | 20180083877 | A | 7/2018 |
| KR | 102315763 | B1 | 10/2021 |
| KR | 20220052186 | A | 4/2022 |
| KR | 102481433 | B1 | 12/2022 |
| WO | 2022265651 | A1 | 12/2022 |

* cited by examiner

PRESSURE SWING ADSORPTION APPARATUS FOR HIGH PURITY HYDROGEN PURIFICATION FROM AMMONIA DECOMPOSITION AND HYDROGEN PURIFICATION METHOD USING THE SAME

TECHNICAL FIELD

The present disclosure relates to a pressure swing adsorption apparatus for high purity hydrogen purification from ammonia decomposition and a hydrogen purification method using the same, and more particularly, to a pressure swing adsorption apparatus for high purity hydrogen purification from ammonia decomposition, including a plurality of adsorption towers including a guard bed unit and a hydrogen purification unit, to produce high purity hydrogen product by improving the physical adsorption selectivity for impurities such as nitrogen ($N_2$), ammonia ($NH_3$) and moisture ($H_2O$) in mixed gas including hydrogen gas to reduce the amount of impurities down to trace levels and a hydrogen purification method using the same.

BACKGROUND ART

Recently, ammonia based hydrogen storage, transport, extraction and utilization technology development is gaining much attention to achieve the goal of carbon neutrality. When clean ammonia is exported from foreign countries, ammonia decomposition technology is required for domestic hydrogen supply, and by-products produced after ammonia decomposition contain hydrogen as well as nitrogen ($N_2$), ammonia ($NH_3$) and moisture ($H_2O$). Accordingly, to produce high purity hydrogen, it is necessary to remove nitrogen, moisture and ammonia. For hydrogen purification from ammonia decomposition, in general, it is necessary to remove moisture, ammonia and nitrogen in that order, and different adsorbents may be used.

Adsorption by chemical bonds with acid groups of adsorbents has been primarily used to remove ammonia, and a temperature swing adsorption purification method has been used to regenerate the adsorbents used at high temperature. The pressure swing adsorption purification method can be only used in physical adsorption by intermolecular forces between impurities and adsorbents.

Currently, the methods for producing high purity hydrogen using ammonia are not yet commercialized, and to separate only high purity hydrogen from decomposed ammonia gas, a hybrid of a Temperature Swing Adsorption (TSA) process for removing undecomposed ammonia and a Pressure Swing Adsorption (PSA) process for removing nitrogen is being developed.

However, since the existing commercial ammonia adsorbents chemically adsorb ammonia through acid-base reaction, they can only adsorb and desorb ammonia by the temperature swing adsorption process, and for use in the pressure swing adsorption process, adsorbents capable of physical adsorption are necessary. Additionally, the existing pressure swing adsorption hydrogen purification process for high purity hydrogen production involves selectively removing CO, $CH_4$ and $CO_2$ from mixed gas including $H_2$, $CO_2$, $CH_4$ and CO, and is only aimed at minimizing the device size and increasing the hydrogen recovery rate.

U.S. Pat. No. 3,986,849 discloses a process of removing $CO_2$ and $N_2$ included in hydrogen in which at least eight adsorption towers are employed, of which at least two simultaneously treat raw gas, with at least three pressure equalization stages.

Additionally, U.S. Pat. No. 5,250,088 discloses a pressure swing adsorption process using three or more adsorption towers for removing moisture and hydrocarbon included in hydrogen, and proposes a method for increasing separation process efficiency by further including a tank to store purge gas.

However, these prior art documents may increase the efficiency of the separation process by using a plurality of adsorption towers, but have problems with contamination of an adsorbent for nitrogen separation and reduction of its lifetime caused by desorption of pre-adsorbed ammonia when a hydrogen purifier for purifying hydrogen from ammonia decomposition is not in operation. Additionally, since the lifetime of an adsorbent for ammonia separation is shorter than the lifetime of the adsorbent for nitrogen separation, when the adsorbents are used in stack, it is necessary to replace all the adsorbents.

Accordingly, there is a need for research on a new separation process for not only selectively adsorbing moisture, ammonia and nitrogen from the mixed hydrogen gas during the ammonia decomposition process and purifying high purity hydrogen but also minimizing the lifetime reduction of the adsorbent caused by impurities such as trace amounts of ammonia.

RELATED LITERATURES

Patent Literature (Patent Literature 1) U.S. Pat. No. 3,986,849
(Patent Literature 2) U.S. Pat. No. 5,250,088

Disclosure

Technical Problem

To solve the above-described problem, the present disclosure is directed to providing a pressure swing adsorption apparatus for hydrogen purification from ammonia decomposition, including a plurality of adsorption towers including a guard bed unit and a hydrogen purification unit, wherein each adsorption tower is packed with different adsorbents.

The present disclosure is further directed to providing a hydrogen purification method using a pressure swing adsorption apparatus for high purity hydrogen purification with improved selective adsorption of moisture, ammonia and nitrogen in mixed hydrogen gas, and maximized hydrogen recovery rate and productivity.

Technical Solution

The present disclosure provides a pressure swing adsorption apparatus for hydrogen purification from ammonia decomposition, including a plurality of adsorption towers including a guard bed unit and a hydrogen purification unit, connected to a raw material feed pipe; a vacuum pump connected to the adsorption towers to keep the adsorption towers in a vacuum state; and a plurality of valves to open/close a plurality of pipes connected to the adsorption towers and the vacuum pump, wherein the guard bed unit is disposed on bottom of the hydrogen purification unit, and the adsorption tower in the guard bed unit is packed with a first adsorbent and a second adsorbent in a multilayer structure to selectively adsorb and remove moisture and ammonia included in mixed hydrogen gas produced after ammonia decomposition fed through the raw material feed pipe, and wherein the hydrogen purification unit is disposed on top of the guard bed unit, and the adsorption tower in the hydrogen purification unit is packed with a third adsorbent to selectively adsorb and remove nitrogen included in the mixed hydrogen gas free of moisture and ammonia from the guard bed unit.

Additionally, the present disclosure provides a hydrogen purification method using the pressure swing adsorption apparatus according to the present disclosure including the plurality of adsorption towers including the guard bed unit and the hydrogen purification unit, connected to the raw material feed pipe; the vacuum pump connected to the adsorption towers to keep the adsorption towers in a vacuum state; and the plurality of valves to open/close the plurality of pipes connected to the adsorption towers and the vacuum pump, the hydrogen purification method including feeding mixed hydrogen gas produced after ammonia decomposition into the adsorption tower of the guard bed unit through the raw material feed pipe; selectively adsorbing and removing moisture by allowing the fed mixed hydrogen gas to pass through a first adsorbent packed at a lower layer region of the adsorption tower in the guard bed unit; selectively adsorbing and removing ammonia by allowing the mixed hydrogen gas free of moisture to pass through a second adsorbent packed at an upper layer region of the adsorption tower in the guard bed unit; feeding the mixed hydrogen gas free of moisture and ammonia into the adsorption tower of the hydrogen purification unit; and selectively adsorbing and removing nitrogen by allowing the fed mixed hydrogen gas free of moisture and ammonia to pass through a third adsorbent packed in the adsorption tower in the hydrogen purification unit to acquire purified hydrogen.

Advantageous Effects

Since the pressure swing adsorption apparatus according to the present disclosure includes the plurality of adsorption towers including the guard bed unit and the hydrogen purification unit wherein each adsorption tower is packed with different adsorbents, it may be possible to purify high purity hydrogen from mixed hydrogen gas produced after ammonia decomposition, make it easy to replace the adsorbent for ammonia removal, and minimize the likelihood that the lifetime of the adsorbent in the hydrogen purification unit is drastically reduced by trace amounts of ammonia.

Additionally, the pressure swing adsorption apparatus of the present disclosure may efficiently recover hydrogen of the guard bed unit, thereby maximizing the hydrogen recovery rate compared to a conventional pressure swing adsorption process including a pretreatment unit and a hydrogen purification unit, and respond to a large change in ammonia concentration in the raw material. In addition, it may be possible to prevent residual gas in the guard bed unit from entering the hydrogen purification unit when the apparatus stops working for a short time or is idle for a long time, thereby preventing the contamination of the adsorbent packed in the hydrogen purification unit and maintaining the separation performance.

Additionally, the hydrogen purification method using the pressure swing adsorption apparatus of the present disclosure may achieve high purity hydrogen purification by physical adsorption of impurities such as moisture ($H_2O$), ammonia ($NH_3$) and nitrogen ($N_2$) included in mixed hydrogen gas produced after ammonia decomposition at or below trace levels, and improve selective adsorption of moisture, ammonia and nitrogen, thereby maximizing the hydrogen recovery rate and productivity. In addition, beginning inventory cost is low, and when only the pressure swing adsorption process is applied, the temperature swing adsorption process is not introduced, and thus it may be possible to eliminate the need for a heat source for regeneration, thereby reducing the driving cost.

The effect of the present disclosure is not limited to the above-mentioned effect. It should be understood that the effect of the present disclosure includes all inferable effects from the following description.

BEST MODE

Figure 1:
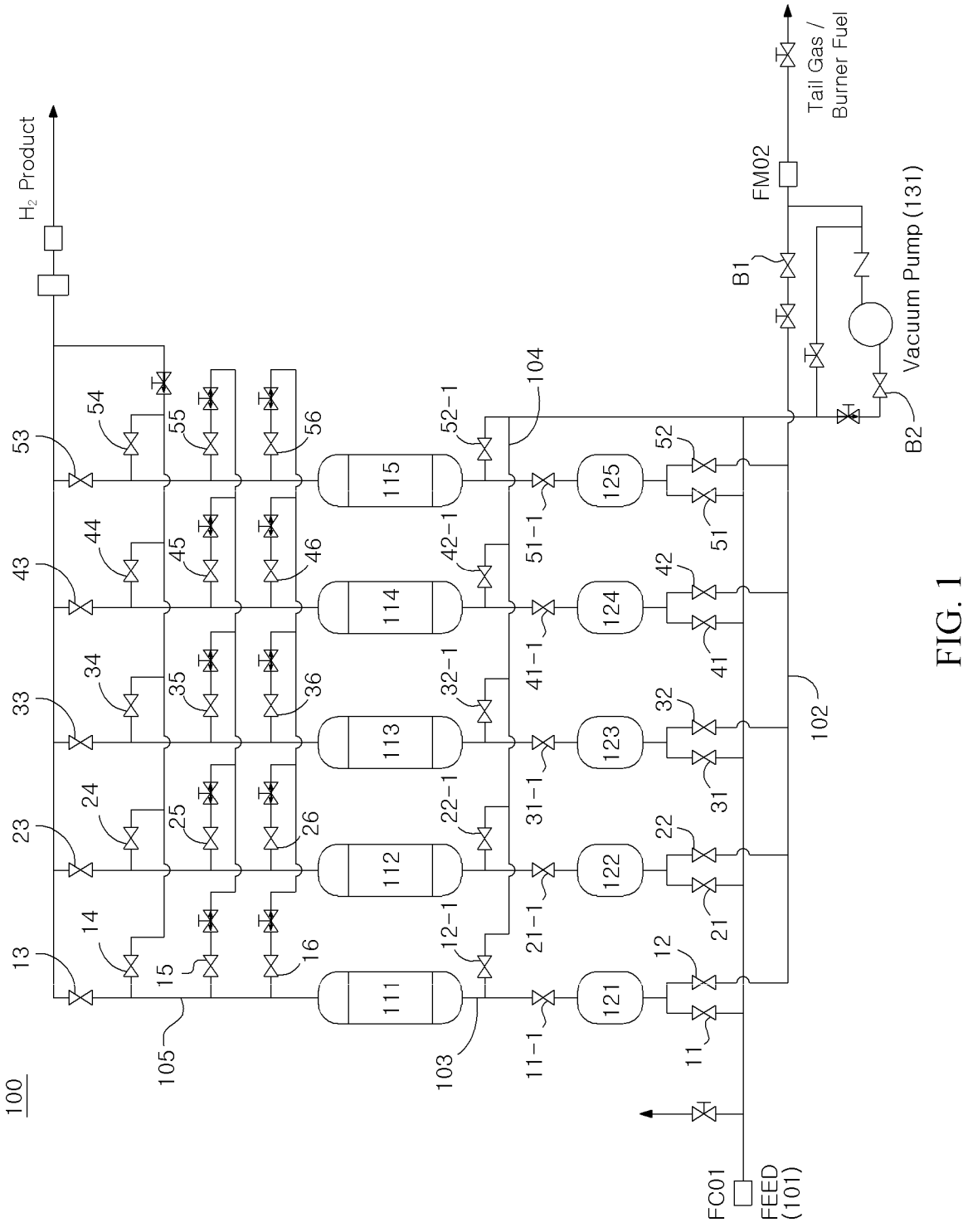
FIG. 1 is a diagram of a pressure swing adsorption apparatus including five-bed guard bed unit and hydrogen purification unit according to the present disclosure.

Hereinafter, the present disclosure will be described in more detail by way of example.

The present disclosure relates to a pressure swing adsorption (PSA) apparatus for purifying high purity hydrogen by removing moisture, ammonia and nitrogen from mixed hydrogen gas produced from ammonia decomposition and a hydrogen purification method using the same.

As described above, when the existing pressure swing adsorption process for purifying hydrogen from ammonia decomposition removes moisture, ammonia and nitrogen in that order, in case that ammonia is adsorbed onto an adsorbent for nitrogen separation, the adsorbent for nitrogen separation loses its adsorption ability, so it is necessary to prevent ammonia from going to the adsorbent for nitrogen. Additionally, when a hydrogen purifier for purifying hydrogen from ammonia decomposition is not in operation, pre-adsorbed ammonia may be desorbed, causing contamination of the adsorbent for nitrogen separation, resulting in reduced lifetime of the adsorbent. Additionally, since the lifetime of an adsorbent for ammonia separation is shorter than the lifetime of the adsorbent for nitrogen separation, when the adsorbents are used in stack, it is necessary to replace all the adsorbents.

Accordingly, the present disclosure provides the pressure swing adsorption apparatus including a plurality of adsorption towers including a guard bed unit to separate moisture and ammonia and a hydrogen purification unit to separate nitrogen wherein each adsorption tower is packed with different adsorbents, thereby achieving high purity hydrogen purification from mixed hydrogen gas produced after ammonia decomposition, making it easy to replace the adsorbent for ammonia removal, and minimizing the likelihood that the lifetime of the adsorbent in the hydrogen purification unit is drastically reduced by trace amounts of ammonia.

Additionally, it may be possible to efficiently recover hydrogen of the guard bed unit, thereby maximizing the hydrogen recovery rate compared to the existing pressure swing adsorption process and respond to a large change in ammonia concentration in the raw material. In addition, it may be possible to prevent residual gas in the guard bed unit from entering the hydrogen purification unit when the apparatus stops working for a short time or is idle for a long time, thereby preventing the contamination of the adsorbent packed in the hydrogen purification unit and maintaining the separation performance.

(a) Configuration of Pressure Swing Adsorption Apparatus 100

Specifically, the present disclosure provides the pressure swing adsorption apparatus 100 for hydrogen purification from ammonia decomposition, including a plurality of adsorption towers including a guard bed unit and a hydrogen purification unit, connected to a raw material feed pipe 101; a vacuum pump 131 connected to the adsorption towers to keep the adsorption towers in a vacuum state; and a plurality of valves to open/close a plurality of pipes connected to the adsorption towers and the vacuum pump 131, wherein the guard bed unit is disposed on bottom of the hydrogen purification unit, and the adsorption tower in the guard bed unit is packed with a first adsorbent and a second adsorbent in a multilayer structure to selectively adsorb and remove moisture and ammonia included in mixed hydrogen gas produced after ammonia decomposition fed through the raw material feed pipe 101, the hydrogen purification unit 111~116 is disposed on top of the guard bed unit, and the adsorption tower in the hydrogen purification unit is packed with a third adsorbent to selectively adsorb and remove nitrogen included in the mixed hydrogen gas free of moisture and ammonia from the guard bed unit.

The pressure swing adsorption apparatus may produce high purity hydrogen by improving the physical adsorption selectivity for impurities such as moisture ($H_2O$), undecomposed ammonia ($NH_3$) and nitrogen ($N_2$) generated in the ammonia decomposition process to reduce the amount of impurities down to trace levels, rather than removing impurities such as carbon monoxide (CO), methane ($CH_4$) and carbon dioxide ($CO_2$) in the hydrogen purification process. Preferably, the pressure swing adsorption apparatus 100 may be a Vacuum Pressure Swing Adsorption (VPSA) apparatus.

The existing four-bed pressure swing adsorption apparatus purifies hydrogen by simultaneously adsorbing moisture, ammonia and nitrogen from mixed hydrogen gas using at least two types of adsorbents stacked in one adsorption tower, but when undecomposed ammonia contacts the adsorbent for nitrogen adsorption, the performance and lifetime of the adsorbent may be reduced. Additionally, the pressure swing adsorption apparatus may include a pretreatment unit in which two or more adsorption towers are arranged in parallel and a hydrogen purification unit in which four or more adsorption towers are arranged in parallel, but there is a limit to improve the hydrogen recovery rate since it is difficult to recover hydrogen in the adsorption tower of the pretreatment unit, and each of the pretreatment unit and the hydrogen purification unit requires each vacuum pump, causing higher power consumption. The components of the adsorption process are not easy to respond to a change in ammonia concentration in the raw material, and when replacing the adsorbent, it is necessary to replace all the stacked adsorbents, resulting in increases in investment cost and driving cost.

The present disclosure includes the plurality of adsorption towers including the guard bed unit for moisture and ammonia adsorption and removal and the hydrogen purification unit for nitrogen adsorption and purification after the moisture and ammonia adsorption and removal, thereby solving the problem with performance and lifetime reduction of the adsorbent for nitrogen adsorption, and achieving the investment and driving cost savings.

The guard bed unit and the hydrogen purification unit may have closed system design, and may be configured to perform the process steps in cooperation with each other.

The guard bed unit and the hydrogen purification unit may be connected in series, and two or more adsorption tower sets, each including the guard bed unit and the hydrogen purification unit connected in series, may be arranged in parallel, preferably four or more adsorption tower sets, and more preferably five to six adsorption tower sets. Each adsorption tower set may allow the mixed hydrogen gas fed through the raw material feed pipe 101 to pass through the guard bed unit and then the hydrogen purification unit to perform adsorption, blowdown, cleaning, raw material pressurization and product pressurization processes to adsorb moisture and ammonia in a sequential order, thereby purifying high purity hydrogen.

The lowest pressure of the adsorption tower in the guard bed unit may be maintained without pressure drop below ¼, and preferably ⅓ to ⅖ of the raw material feed pressure when the mixed hydrogen gas flows in the raw material flow direction (co-current direction). In case that the lowest pressure is lower than ¼, ammonia in the guard bed unit may enter the hydrogen purification unit.

The lower layer region in the adsorption tower of the guard bed unit may be packed with the first adsorbent and the upper layer region may be packed with the second adsorbent, and when the mixed hydrogen gas is fed from the raw material feed pipe 101, moisture and ammonia may be selectively adsorbed while the mixed hydrogen gas passes through the lower layer region and the upper layer region in the adsorption tower in a sequential order.

The first adsorbent may be packed at the lower layer region in the adsorption tower of the guard bed unit, and may be at least one selected from the group consisting of first activated alumina, silica gel, alumina silica gel and zeolite capable of removing moisture, and preferably first activated alumina or silica gel.

The first adsorbent may be included in an amount of 1 to 70 wt %, preferably 1 to 60 wt %, and most preferably 1 to 50 wt % relative to the second adsorbent. When the amount of the first adsorbent is less than 1 wt %, moisture removal may be inadequate, and on the contrary, when the amount of the first adsorbent is more than 70 wt %, it may fail to easily respond to a change in ammonia concentration.

The second adsorbent may be packed at the upper layer region in the adsorption tower of the guard bed unit, and may be at least one selected from the group consisting of metal impregnated activated carbon, silica gel, alumina silica gel, zeolite and second activated alumina, and preferably metal impregnated activated carbon, silica gel or zeolite.

The metal impregnated activated carbon has high ammonia selectivity and high ammonia adsorption capacity. The metal impregnated activated carbon may be activated carbon impregnated with at least one metal selected from the group consisting of Mg, Ca, Mn and Cu, preferably magnesium (Mg) impregnated activated carbon or calcium (Ca) impregnated activated carbon, and most preferably, magnesium (Mg) impregnated activated carbon. The magnesium impregnated activated carbon has higher ammonia adsorption performance than the other metal impregnated activated carbon and high ammonia adsorption capacity in small amounts.

The amount of metal impregnated in the metal impregnated activated carbon may be 1 to 10 wt %, preferably 1 to 8 wt %, and most preferably 1 to 6 wt %. In this instance, when the amount of metal impregnated is less than 1 wt %, the ammonia adsorption performance may not reach the expected level of performance, and on the contrary, when the amount of metal impregnated is more than 10 wt %, an increase in adsorbent regeneration time is not favorable for the pressure swing adsorption process, which makes it difficult to adsorb ammonia in trace amounts of 0.1 ppm or less.

The silica gel, the zeolite and the second activated alumina also may have high ammonia selectivity and fast ammonia adsorption, and thus may be used in very small amounts to remove ammonia in the pressure swing adsorption process.

The second adsorbent may be included in an amount of 30 to 99 wt %, preferably 3 to 60 wt %, and most preferably 12 to 50 wt % relative to the first adsorbent. When the amount of the second adsorbent is less than 30 wt %, the adsorption quantity of ammonia may decrease, and on the contrary, when the amount of the second adsorbent is more than 99 wt %, it may fail to easily response to a change in moisture concentration.

The hydrogen purification unit may include two or more adsorption towers, preferably four or more adsorption towers, and most preferably, five to six adsorption towers arranged in parallel, and the hydrogen purification unit may allow the mixed hydrogen gas having undergone moisture and ammonia purification through the guard bed unit to pass through, to perform the adsorption, first pressure equalization, cleaning feed, second pressure equalization, blowdown, cleaning and pressurization processes in conjunction with the guard bed unit to adsorb and remove nitrogen, thereby acquiring hydrogen with high hydrogen recovery rate and high purity.

The adsorption tower in the hydrogen purification unit is packed with the third adsorbent to selectively adsorb nitrogen included in the mixed hydrogen gas having undergone moisture and ammonia purification so as to purify high purity hydrogen.

The third adsorbent may be at least one selected from the group consisting of zeolite NaA, zeolite CaA, zeolite CaNaA, zeolite LiX, zeolite LiNaX, zeolite LiCaX, zeolite LiNaCaX, zeolite NaX, zeolite CaX, zeolite CaNaX and zeolite KX, preferably zeolite LiX, zeolite CaX or a mixture thereof, and most preferably zeolite CaX.

The pressure swing adsorption apparatus 100 may further include a hydrogen storage tank to capture purified hydrogen from the adsorption tower.

In particular, although it is not explicitly described in the following example or comparative example, in the pressure swing adsorption apparatus 100 according to the present disclosure, the hydrogen purification process was continuously performed 100 times using the mixed hydrogen gas produced after ammonia decomposition with varying eight conditions below.

As a result, as opposed to other conditions and numerical ranges, when the following conditions are all satisfied, the purity of the purified hydrogen was 99.99% or more, and the hydrogen recovery rate showed the improved value of 92.5% or more.

①  The lowest pressure of the adsorption tower in the guard bed unit is maintained without pressure drop below ⅓ to ⅔ of the raw material feed pressure, ②  the first adsorbent is packed at the lower layer region in the adsorption tower of the guard bed unit, and is first activated alumina or silica gel capable of removing moisture, ③  the first adsorbent is packed in an amount of 10 to 35 wt % relative to the second adsorbent in the adsorption tower of the guard bed unit, ④  the second adsorbent is packed at the upper layer region in the adsorption tower of the guard bed unit, and is metal impregnated activated carbon capable of removing ammonia, ⑤  the second adsorbent is packed in an amount of 65 to 90 wt % relative to the first adsorbent in the adsorption tower of the guard bed unit, ⑥  the metal impregnated activated carbon is magnesium (Mg) impregnated activated carbon or calcium (Ca) impregnated activated carbon, ⑦  the amount of metal impregnated in the metal impregnated activated carbon is 1 to 8 wt %, and ⑧  the third adsorbent is zeolite LiX, zeolite CaX or a mixture thereof.

However, when any one of the above eight conditions is not satisfied, the recovery rate of the purified hydrogen was as low as 75% or less, and unadsorbed moisture, ammonia or nitrogen was detected more than the reference range and the purity of the purified hydrogen showed a low value of 86% or less.

FIG. 1 is a diagram of the pressure swing adsorption apparatus 100 including five-bed guard bed unit and hydrogen purification unit according to the present disclosure. Referring to FIG. 1, the pressure swing adsorption apparatus 100 includes the plurality of adsorption towers 111~115 including the guard bed unit 121~125 and the hydrogen purification unit connected to the raw material feed pipe 101, the vacuum pump 131 connected to keep, in a vacuum state, each of the guard bed unit 121~125 and the plurality of adsorption towers 111~115 respectively connected in series to each other, and the plurality of valves to open/close the plurality of pipes 102~108 connecting the guard bed unit 121~125, the plurality of adsorption towers 111~115 and the vacuum pump 131.

Additionally, it shows the guard bed unit 121~125 in which five adsorption towers GB1, GB2, GB3, GB4, GB5 are arranged in parallel, and the hydrogen purification unit in which five adsorption towers 111~115 are arranged in parallel. Each adsorption tower of the guard bed unit and each adsorption tower of the hydrogen purification unit may be connected in series to perform the adsorption step, the first pressure equalization step, the second pressure equalization step, the purge providing step, the third pressure equalization step, the countercurrent blowdown step, the vacuum purge step, the first pressurization step, the second pressurization step, the third pressurization step and the final pressurization step by product in one cycle together in an organic manner.

The bottom of the adsorption towers in the guard bed unit 121~126 is connected to the raw material feed pipe 101 for feeding the mixed hydrogen gas through the first raw material feed valve 11. Each adsorption tower of the guard bed unit and the hydrogen purification unit may purify high purity hydrogen from the by-products produced after ammonia decomposition by performing the process including the adsorption step, the first pressure equalization step, the second pressure equalization step, the purge providing step, the third pressure equalization step, the countercurrent blowdown step, the vacuum purge step, the first pressurization step, the second pressurization step, the third pressurization step and the final pressurization step by product in one cycle on moisture, ammonia and nitrogen included in the mixed hydrogen gas fed through the raw material feed pipe 101.

First to fifth countercurrent blowdown valves 12, 22, 32, 42, 52 are disposed below the adsorption tower of the guard bed unit to adjust the pressure through the first to fifth raw material feed valves 11, 21, 31, 41, 51 and the vacuum pump 131 to which the mixed hydrogen gas is fed from the raw material feed pipe 101. Additionally, first to fifth outlet valves 11-1, 21-1, 31-1, 41-1, 51-1 where the mixed hydrogen gas free of moisture and ammonia exits are disposed above the adsorption tower of the guard bed unit.

First to fifth vacuum purge valves 16, 26, 36, 46, 56 are disposed above the adsorption tower of the hydrogen purification unit, first to sixth pressure equalization valves 15, 25, 35, 45, 55 for pressure equalization are disposed at the higher location connected to the vacuum purge valves, and first to fifth pressurization valves 14, 24, 34, 44, 54 for product pressurization are disposed at the much higher location connected to the pressure equalization valves. Additionally, first to fifth product production valves 13, 23, 33, 43, 53 are disposed at the highest location above the adsorption tower of the hydrogen purification unit to transport the purified hydrogen, and first to sixth countercurrent blowdown valves 12-1, 22-1, 32-1, 42-1, 52-1 are disposed below the adsorption tower to adjust the pressure of the adsorption tower.

The guard bed unit and the hydrogen purification unit may perform the desorption process by providing cleaning gas in the vacuum purge step through the first to fifth countercurrent blowdown valves 12~52, 12-1~52-1. Each of the countercurrent blowdown valves of the guard bed unit and the hydrogen purification unit is separately arranged to prevent backflow of ammonia from the guard bed unit to the hydrogen purification unit due to a pressure difference.

The adsorption towers 121~126 of the guard bed unit and the adsorption towers 111~116 of the hydrogen purification unit are connected in series through the plurality of pipes 102~108 connecting each adsorption tower, wherein the guard bed unit is configured to remove moisture and ammonia and the hydrogen purification unit is configured to remove nitrogen, thereby achieving high purity hydrogen production, high hydrogen recovery rate and low power driving.

Figure 2:
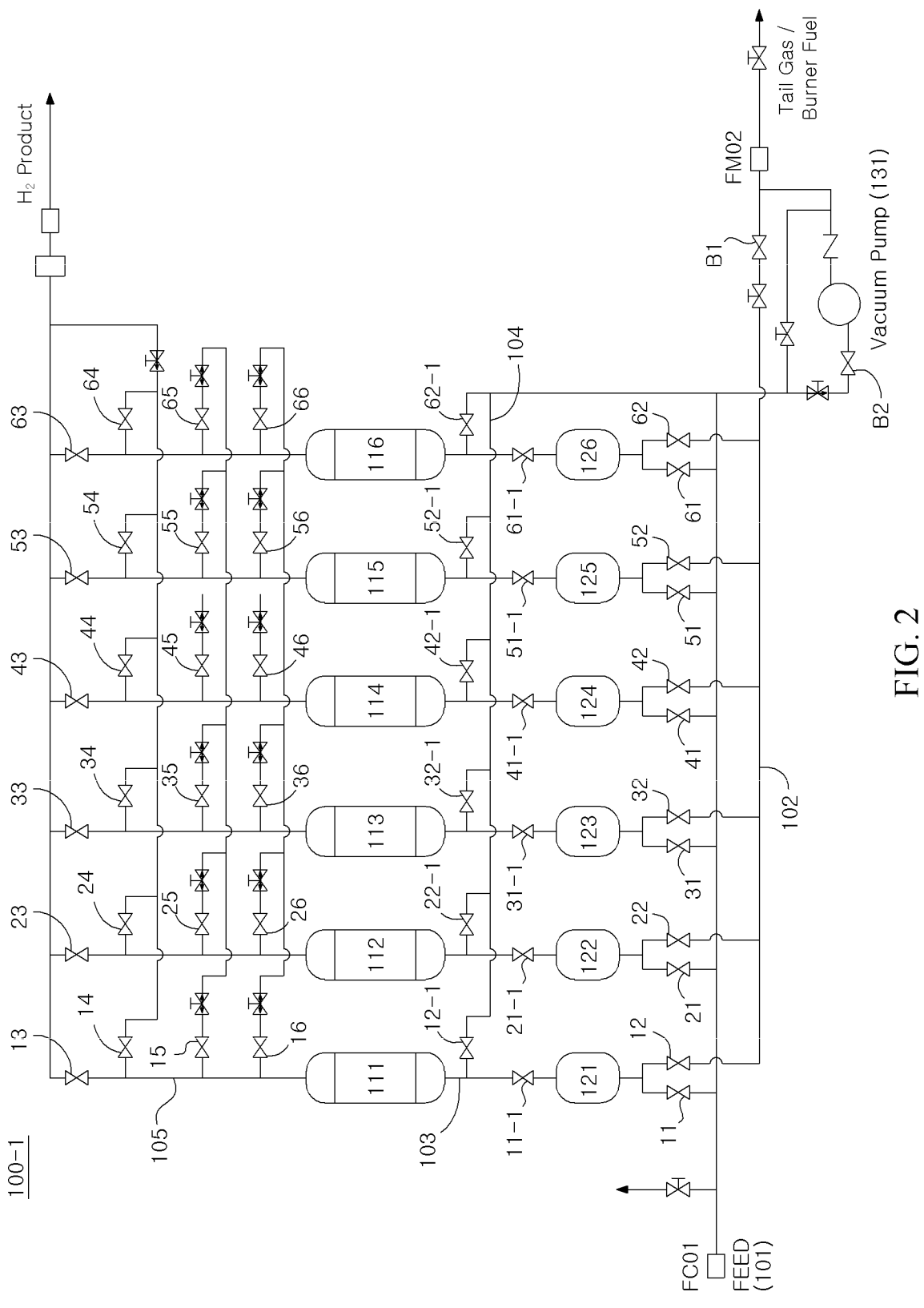
FIG. 2 is a diagram of a pressure swing adsorption apparatus including six-bed guard bed unit and hydrogen purification unit according to the present disclosure.

FIG. 2 is a diagram of a pressure swing adsorption apparatus 100-1 including six-bed guard bed unit and hydrogen purification unit according to the present disclosure. Referring to FIG. 2, the six-bed pressure swing adsorption apparatus 100-1 may improve the recovery rate more than the five-bed pressure swing adsorption apparatus 100, and the basic purification method is similar to the following hydrogen purification method using the five-bed pressure swing adsorption apparatus in an order of adsorption, pressure equalization, purge providing, pressure equalization, countercurrent blowdown, vacuum purge, pressurization and product pressurization.

(b) Hydrogen Purification Method Using Pressure Swing Adsorption Apparatus Including Guard Bed Unit and Hydrogen Purification Unit Meanwhile, the present disclosure provides the hydrogen purification method using the pressure swing adsorption apparatus 100 according to the present disclosure including the plurality of adsorption towers including the guard bed unit and the hydrogen purification unit 111~116, connected to the raw material feed pipe 101; the vacuum pump 131 connected to the adsorption towers to keep the adsorption towers in a vacuum state; and the plurality of valves to open/close the plurality of pipes connected to the adsorption towers and the vacuum pump, the hydrogen purification method including the steps of feeding mixed hydrogen gas produced after ammonia decomposition into the adsorption tower of the guard bed unit through the raw material feed pipe 101; selectively adsorbing and removing moisture by allowing the fed mixed hydrogen gas to pass through the first adsorbent packed at the lower layer region of the adsorption tower in the guard bed unit; selectively adsorbing and removing ammonia by allowing the mixed hydrogen gas free of moisture to pass through the second adsorbent packed at the upper layer region of the adsorption tower in the guard bed unit; feeding the mixed hydrogen gas free of moisture and ammonia into the adsorption towers 111~116 of the hydrogen purification unit; selectively adsorbing and removing nitrogen by allowing the fed mixed hydrogen gas free of moisture and ammonia to pass through the third adsorbent packed in the adsorption towers 111~116 in the hydrogen purification unit to acquire purified hydrogen.

The step of feeding the mixed hydrogen gas may include feeding the mixed hydrogen gas emitted after the removal of moisture and ammonia at one adsorption tower in the guard bed unit. In this instance, the other adsorption tower in the guard bed unit may perform the process including the step of cleaning gas higher than the atmospheric pressure fed from the hydrogen purification unit 111~116 after countercurrent blowdown below the adsorption driving pressure; the raw material pressurization step; and the product pressurization step to physically adsorb and remove moisture and ammonia from the mixed hydrogen gas produced after ammonia decomposition.

The fed mixed hydrogen gas may be allowed to pass through the lower layer region of the adsorption tower in the guard bed unit to selectively adsorb and purify moisture, and subsequently, may be allowed to pass through the upper layer region in a sequential order to selectively adsorb and purify ammonia. In particular, the step of selectively adsorbing and purifying ammonia may include adsorbing and purifying ammonia such that the amount of ammonia in the mixed hydrogen gas having undergone moisture purification is less than 0.1 ppm.

According to an embodiment, the guard bed unit may include first to fifth adsorption towers, and each of the first to fifth adsorption towers may perform the adsorption step, the first pressure equalization step, the second pressure equalization step, the purge providing step, the countercurrent blowdown step, the vacuum purge step, the first pressurization step, the second pressurization step and the final pressurization step by product in a sequential order in order to remove moisture and ammonia from the mixed hydrogen gas fed from the raw material feed pipe 101, and the hydrogen purification unit may include first to fifth adsorption towers 111~115, and each of the first to fifth adsorption towers may perform the adsorption step, the first pressure equalization step, the second pressure equalization step, the purge providing step, the countercurrent blowdown step, the vacuum purge step, the first pressurization step, the second pressurization step and the final pressurization step by product in a sequential order to remove nitrogen from the mixed hydrogen gas free of moisture and ammonia fed from the guard bed unit and increase the purity and recovery rate of the hydrogen product.

Preferably, the guard bed unit may include the first to fifth adsorption towers, and each of the first to fifth adsorption towers may perform the adsorption step, the first pressure equalization step, the second pressure equalization step, the purge providing step, the countercurrent blowdown step, the vacuum purge step, the first pressurization step, the second pressurization step, the third pressurization step and the final pressurization step by product in a sequential order, and the hydrogen purification unit may include the first to fifth adsorption towers 111~115, and each of the first to fifth adsorption towers may perform the adsorption step, the first pressure equalization step, the second pressure equalization step, the purge providing step, the third pressure equalization step, the countercurrent blowdown step, the vacuum purge step, the first pressurization step, the second pressurization step, the third pressurization step and the final pressurization step by product in a sequential order.

More specifically, in the guard bed unit and the hydrogen purification unit 111~116, the four adsorption towers other than the adsorption tower into which the mixed hydrogen gas free of ammonia was fed may perform the steps in one cycle, i.e., the adsorption step, the first pressure equalization step, the second pressure equalization step, the purge providing step, the third pressure equalization step, the countercurrent blowdown step, the vacuum purge step, the first pressurization step, the second pressurization step, the third pressurization step and the final pressurization step by product in the order of one cycle, and the second adsorption tower may perform the third pressurization step, the third adsorption tower may perform the vacuum purge step, the fourth adsorption tower may perform the purge providing step, and the fifth adsorption tower may perform the first pressure equalization step in the order of one cycle, respectively.

According to another embodiment, the guard bed unit may include first to sixth adsorption towers, and each of the first to sixth adsorption towers may perform the adsorption step, the first pressure equalization step, the second pressure equalization step, the third pressure equalization step, the purge providing step, the countercurrent blowdown step, the vacuum purge step, the first pressurization step, the second pressurization step, the third pressurization step and the final pressurization step by product in a sequential order to remove moisture and ammonia from the mixed hydrogen gas fed from the raw material feed pipe 101, and the hydrogen purification unit may include first to sixth adsorption towers 111~116, and each of the first to sixth adsorption towers may perform the adsorption step, the first pressure equalization step, the second pressure equalization step, the third pressure equalization step, the purge providing step, the countercurrent blowdown step, the vacuum purge step, the first pressurization step, the second pressurization step, the third pressurization step and the final pressurization step by product in a sequential order to remove nitrogen from the mixed hydrogen gas free of moisture and ammonia fed from the guard bed unit and increase the purity and recovery rate of the hydrogen product.

Preferably, the guard bed unit may include the first to sixth adsorption towers, and each of the first to sixth adsorption towers may perform the adsorption step, the first pressure equalization step, the second pressure equalization step, the third pressure equalization step, the purge providing step, the countercurrent blowdown step, the vacuum purge step, the first pressurization step, the second pressurization step, the third pressurization step, the fourth pressurization step and the final pressurization step by product in a sequential order to remove moisture and ammonia from the mixed hydrogen gas fed from the raw material feed pipe 101, and the hydrogen purification unit may include first to sixth adsorption towers 111~116, and each of the first to sixth adsorption towers may perform the adsorption step, the first pressure equalization step, the second pressure equalization step, the third pressure equalization step, the fourth pressure equalization step, the purge providing step, the countercurrent blowdown step, the vacuum purge step, the first pressurization step, the second pressurization step, the third pressurization step, the fourth pressurization step and the final pressurization step by product in a sequential order to remove nitrogen from the mixed hydrogen gas free of moisture and ammonia fed from the guard bed unit and increase the purity and recovery rate of the hydrogen product.

More preferably, the guard bed unit may include the first to sixth adsorption towers, and each of the first to sixth adsorption towers may perform the adsorption step, the first pressure equalization step, the second pressure equalization step, the third pressure equalization step, the purge providing step, the countercurrent blowdown step, the vacuum purge step, the first pressurization step, the second pressurization step, the third pressurization step, the fourth pressurization step and the final pressurization step by product in a sequential order to remove moisture and ammonia from the mixed hydrogen gas fed from the raw material feed pipe 101, and the hydrogen purification unit may include the first to sixth adsorption towers 111~116, and each of the first to sixth adsorption towers may perform the adsorption step, the first pressure equalization step, the second pressure equalization step, the third pressure equalization step, the purge providing step, the fourth pressure equalization step, the countercurrent blowdown step, the vacuum purge step, the first pressurization step, the second pressurization step, the third pressurization step, the fourth pressurization step and the final pressurization step by product in a sequential order to remove nitrogen from the mixed hydrogen gas free of moisture and ammonia fed from the guard bed unit and increase the purity and recovery rate of the hydrogen product.

The step of feeding into the adsorption towers 111~116 of the hydrogen purification unit may include feeding the mixed hydrogen gas having undergone ammonia purification into one adsorption tower in the hydrogen purification unit.

The step of acquiring purified hydrogen after selective adsorption of nitrogen may include adsorbing and purifying such that the amount of nitrogen in the mixed hydrogen gas having undergone ammonia purification is less than 10 ppm.

The hydrogen purification method using the pressure swing adsorption apparatus 100 may further include the step of capturing the hydrogen acquired after the step of acquiring the purified hydrogen in the hydrogen storage tank; and the step of circulating and providing the hydrogen in the hydrogen storage tank for use in the cleaning step of the other adsorption tower and the product pressurization step of the guard bed unit and the hydrogen purification unit 111~116.

Each of the plurality of adsorption towers including the guard bed unit and the hydrogen purification unit 111~116 may repeatedly perform the hydrogen purification process in a periodic manner on the mixed hydrogen gas being fed, after a cycle of the process of adsorbing and purifying moisture, ammonia and nitrogen is performed.

The method may further include the step of regenerating the first and second adsorbents of the guard bed unit by providing the tail gas emitted from the adsorption towers 111~116 of the hydrogen purification unit as purge gas to the adsorption tower of the guard bed unit having undergone the countercurrent blowdown step. In this instance, the tail gas stream emitted separately from the hydrogen product stream may be continuously emitted to supply a heat source for heating an ammonia decomposition apparatus without discontinuity.

The process of removing moisture, ammonia and nitrogen using the pressure swing adsorption apparatus 100 according to the present disclosure may be performed by the plurality of adsorption towers including the guard bed unit and the hydrogen purification unit as below.

According to an embodiment, each adsorption tower 121~125 of the guard bed unit and each adsorption tower 111~115 of the hydrogen purification unit may perform the adsorption step, the first pressure equalization step, the second pressure equalization step, the purge providing step, the third pressure equalization step, the countercurrent blowdown step, the vacuum purge step, the first pressurization step, the second pressurization step, the third pressurization step and the final pressurization step by product.

The driving method of FIG. 1 includes feeding the mixed hydrogen gas produced after decomposition of raw gas, i.e., ammonia into the first adsorption tower 121 of the guard bed unit through the raw material feed pipe 101 with the first feed valve 11 connected to the first adsorption tower 121 of the guard bed unit open. While impurities such as moisture and undecomposed ammonia contained in the mixed hydrogen gas fed into the first adsorption tower 121 pass through the first and second adsorbents packed in a multilayer structure within the first adsorption tower 111 of the guard bed unit, moisture and ammonia is adsorbed and purified in a sequential order, and the remaining mixed gas including nitrogen and hydrogen is acquired. Subsequently, the mixed gas including nitrogen and hydrogen passes through the first adsorption tower 121 of the guard bed unit and moves through the pipe 103 with the valve 11-1 open, and then is fed into the first adsorption tower 111 in the hydrogen purification unit.

The ammonia concentration in the mixed hydrogen gas fed into the hydrogen purification unit 111~116 is monitored in real time to maintain the ammonia concentration below 0.1 ppm. In this instance, while the first adsorption tower 121 of the guard bed unit and the first adsorption tower 111 of the hydrogen purification unit perform the adsorption step, the second adsorption tower 122 of the guard bed unit and the second adsorption tower 112 of the hydrogen purification unit perform the first pressurization step to the production pressurization step among the steps in one cycle in a sequential order.

First, the fifth adsorption tower 125 of the guard bed unit and the fifth adsorption tower 115 of the hydrogen purification unit perform the first pressure equalization step through the second pressure equalization valves 24, 54 to carry out co-current blowdown, and perform the third pressurization step using gas fed from the pipe 108 of the hydrogen purification unit to carry out countercurrent pressurization. After the countercurrent pressurization, the second adsorption tower 112 performs the final pressurization by product using high purity hydrogen produced from the first adsorption tower 121 of the guard bed unit and the first adsorption tower 111 of the hydrogen purification unit. For the product pressurization, the second pressure equalization valves 24, 54 are closed and the second pressurization valve 24 is open, and the product pressurization is performed until the adsorption pressure.

In this instance, the third adsorption tower 123 of the guard bed unit and the third adsorption tower 113 of the hydrogen purification unit perform the vacuum purge step and the first pressurization step among the steps in one cycle in a sequential order. The fourth adsorption tower 124 of the guard bed unit and the fourth adsorption tower 114 of the hydrogen purification unit perform the purge providing step of providing necessary vacuum purge gas to the third adsorption tower 123 and the third adsorption tower 113 of the hydrogen purification unit through the pipe 106 with the third vacuum purge valve 36 open, and performs vacuum desorption through the vacuum pump pipe 102 with the third countercurrent blowdown valve 32 open.

After the vacuum purge step, the third adsorption tower 123 and the third adsorption tower 113 of the hydrogen purification unit perform the first pressurization step through blowdown by the third pressure equalization step of the fourth adsorption tower 114 of the hydrogen purification unit through the valves and pipes. To prevent contamination of ammonia in the hydrogen purification unit, the fourth adsorption tower 124 of the guard bed unit performs the countercurrent blowdown step without the third pressure equalization step to vent with the fourth countercurrent blowdown valve 42 open. After the third pressure equalization step, the fourth adsorption tower 114 of the hydrogen purification unit performs the countercurrent blowdown step with the countercurrent blowdown valve 42-1 open. After the first pressurization step, the third adsorption tower 123 of the guard bed unit and the third adsorption tower 113 of the hydrogen purification unit perform the second pressurization step through co-current blowdown by the second pressure equalization step of the fifth adsorption tower 125 of the guard bed unit and the fifth adsorption tower 115 of the hydrogen purification unit, and perform through the pipe 107 with the third vacuum purge valve 36 closed and the fourth pressure equalization valve 45 and the fifth pressure equalization valve 55 open.

The first adsorption tower 121 of the guard bed unit and the first adsorption tower 111 of the hydrogen purification unit perform the adsorption step, followed by co-current blowdown by the first pressure equalization step and the second pressure equalization step with the first raw material feed valve 11 closed, and in this instance, the second adsorption tower 122 of the guard bed unit and the second adsorption tower 112 of the hydrogen purification unit perform the adsorption step with the second raw material feed valve 21 open. With the first and third pressure equalization valves 15, 35 open, the first adsorption tower 121 of the guard bed unit and the first adsorption tower 111 of the hydrogen purification unit perform the first pressure equalization step to carry out countercurrent blowdown through the pipe 107 and the third adsorption tower 123 of the guard bed unit and the third adsorption tower 113 of the hydrogen purification unit perform the third pressurization step to carry out countercurrent pressurization. After the first pressure equalization step, the first adsorption tower 121 of the guard bed unit and the first adsorption tower 111 of the hydrogen purification unit carry out co-current blowdown by the second pressure equalization step through the opening of the first and fourth pressure equalization valves 15, 45 and the pipe 107 and the fourth adsorption tower 124 of the guard bed unit and the fourth adsorption tower 114 of the hydrogen purification unit carry out countercurrent pressurization by the second pressurization step.

After the countercurrent pressurization, the third adsorption tower performs the final pressurization step by product using the high purity hydrogen produced from the second adsorption tower 122 of the guard bed unit and the second adsorption tower 112 of the hydrogen purification unit. For the product pressurization, the first and third pressure equalization valves 15, 35 are closed and the third pressurization valve 34 is open, and the final pressurization step by product is performed until the adsorption pressure. In this instance, the fourth adsorption tower 124 of the guard bed unit and the fourth adsorption tower 114 of the hydrogen purification unit perform the vacuum purge step and the first pressurization step among the steps in one cycle in a sequential order. The fifth adsorption tower 125 of the guard bed unit and the fifth adsorption tower 115 of the hydrogen purification unit perform the purge providing step of providing necessary vacuum purge gas to the fourth adsorption tower GB-4 of the guard bed unit and the fourth adsorption tower 114 of the hydrogen purification unit through the pipe 106 with the fourth and fifth vacuum purge valves 46, 56 open, and carry out vacuum desorption through the vacuum pump pipe 102 with the fourth countercurrent blowdown valve 42 open.

After the vacuum purge step, the fourth adsorption tower 124 of the guard bed unit and the fourth adsorption tower 114 of the hydrogen purification unit perform the first pressurization step through co-current blowdown by the third pressure equalization step of the fifth adsorption tower 115 of the hydrogen purification unit through the valves and pipes. To prevent contamination of ammonia in the hydrogen purification unit, the fifth adsorption tower 125 of the guard bed unit performs the countercurrent blowdown step without the third pressure equalization step to vent with the fifth countercurrent blowdown valve 52 open. After the third pressure equalization step, the fifth adsorption tower 115 of the hydrogen purification unit performs the countercurrent blowdown step with the fifth countercurrent blowdown valve 52-1 open.

After the first pressurization step, the fourth adsorption tower 124 of the guard bed unit and the fourth adsorption tower 114 of the hydrogen purification unit perform the second pressurization step through co-current blowdown by the second pressure equalization step of the first adsorption tower 121 of the guard bed unit and the first adsorption tower 111 of the hydrogen purification unit, and perform through the pipe 107 with the fourth vacuum purge valve 46 closed and the first and fourth pressure equalization valves 15, 45 open.

The second adsorption tower 122 of the guard bed unit and the second adsorption tower 112 of the hydrogen purification unit perform the adsorption step, followed by co-current blowdown by the first pressure equalization step and the second pressure equalization step with the second raw material feed valve 21 closed, and in this instance, the third adsorption tower 123 of the guard bed unit and the third adsorption tower 113 of the hydrogen purification unit perform the adsorption step with the third raw material feed valve 31 open. With the second and fourth pressure equalization valves 25, 45 open, the second adsorption tower 122 of the guard bed unit and the second adsorption tower 112 of the hydrogen purification unit perform the first pressure equalization step to carry out countercurrent blowdown through the pipe 107, and the fourth adsorption tower 124 of the guard bed unit and the fourth adsorption tower 114 of the hydrogen purification unit perform the third pressurization step to carry out countercurrent pressurization.

After the first pressure equalization step, the second adsorption tower 122 of the guard bed unit and the second adsorption tower 112 of the hydrogen purification unit carry out co-current blowdown by the second pressure equalization step through the opening of the second and fifth pressure equalization valves 25, 55 and the pipe 107, and the fifth adsorption tower 125 of the guard bed unit and the fifth adsorption tower 115 of the hydrogen purification unit carry out countercurrent blowdown by the second pressurization step. After the countercurrent pressurization, the fourth adsorption tower 124 of the guard bed unit and the fourth adsorption tower 114 of the hydrogen purification unit perform the final pressurization step by product using the high purity hydrogen produced from the third adsorption tower 123 of the guard bed unit and the third adsorption tower 113 of the hydrogen purification unit.

For the product pressurization, the second and fifth pressure equalization valves 25, 55 are closed and the fourth pressurization valve 44 is open, and the final pressurization step by product is performed until the adsorption pressure. In this instance, the fifth adsorption tower 125 of the guard bed unit and the fifth adsorption tower 115 of the hydrogen purification unit perform the vacuum purge step and the first pressurization step among the steps in one cycle in a sequential order. The first adsorption tower 121 of the guard bed unit and the first adsorption tower 111 of the hydrogen purification unit perform the purge providing step of providing necessary vacuum purge gas to the fifth adsorption tower 125 of the guard bed unit and the fifth adsorption tower 115 of the hydrogen purification unit through the pipe 106 with the first and fifth vacuum purge valves 16, 56 open, and perform vacuum desorption through the vacuum pump pipe 102 with the fifth countercurrent blowdown valve 52 open.

After the vacuum purge step, the fifth adsorption tower 125 of the guard bed unit and the fifth adsorption tower 115 of the hydrogen purification unit perform the first pressurization step through co-current blowdown by the third pressure equalization step of the first adsorption tower 111 of the hydrogen purification unit through the valves and pipes. To prevent contamination of ammonia in the hydrogen purification unit, the first adsorption tower 121 of the guard bed unit performs the countercurrent blowdown step without the third pressure equalization step to vent with the first countercurrent blowdown valve 12 open. After the third pressure equalization step, the first adsorption tower 111 of the hydrogen purification unit performs the countercurrent blowdown step with the first countercurrent blowdown valve 12-1 open. After the first pressurization step, the fifth adsorption tower 125 of the guard bed unit and the fifth adsorption tower 115 of the hydrogen purification unit perform the second pressurization step through co-current blowdown by the second pressure equalization step of the second adsorption tower 122 of the guard bed unit and the second adsorption tower 112 of the hydrogen purification unit, and performs through the pipe 107 with the fifth vacuum purge valve 56 closed and the second and fifth pressure equalization valves 25, 55 open.

The third adsorption tower 123 of the guard bed unit and the third adsorption tower 113 of the hydrogen purification unit perform the adsorption step, followed by co-current blowdown by the first pressure equalization step and the second pressure equalization step with the third raw material feed valve 31 closed, and in this instance, the fourth adsorption tower 124 of the guard bed unit and the fourth adsorption tower 114 of the hydrogen purification unit perform the adsorption step with the fourth raw material feed valve 41 open. With the third and fifth pressure equalization valves 35, 55 open, the third adsorption tower 123 of the guard bed unit and the third adsorption tower 113 of the hydrogen purification unit perform the first pressure equalization step to carry out co-current blowdown through the pipe 107, and the fifth adsorption tower 125 of the guard bed unit and the fifth adsorption tower 115 of the hydrogen purification unit perform the third pressurization step to carry out countercurrent pressurization.

After the first pressure equalization step, the third adsorption tower 123 of the guard bed unit and the third adsorption tower 113 of the hydrogen purification unit carry out co-current blowdown by the second pressure equalization step through the opening of the first and third pressure equalization valves 15, 35 and the pipe 107, and the first adsorption tower 121 of the guard bed unit and the first adsorption tower 111 of the hydrogen purification unit carry out countercurrent blowdown by the second pressurization step.

After the countercurrent pressurization by the third pressurization step, the fifth adsorption tower 125 of the guard bed unit and the fifth adsorption tower 115 of the hydrogen purification unit perform the final pressurization step by product using the high purity hydrogen produced from the fourth adsorption tower 124 of the guard bed unit and the fourth adsorption tower 114 of the hydrogen purification unit. For the product pressurization, the first and third pressure equalization valves 15, 35 are closed and the fifth pressurization valve 54 is open, and the final pressurization step by product is performed until the adsorption pressure. In this instance, the first adsorption tower 121 of the guard bed unit and the first adsorption tower 111 of the hydrogen purification unit perform the vacuum purge step and the first pressurization step among the steps in one cycle in a sequential order. The second adsorption tower 122 of the guard bed unit and the second adsorption tower 112 of the hydrogen purification unit perform the purge providing step of providing necessary vacuum purge gas to the first adsorption tower 121 of the guard bed unit and the first adsorption tower 111 of the hydrogen purification unit through the pipe 106 with the first and second vacuum purge valves 16, 26 open, and performs vacuum desorption through the vacuum pump pipe 102 with the first countercurrent blowdown valve 12 open.

After the vacuum purge step, the first adsorption tower 121 and the first adsorption tower 111 of the hydrogen purification unit perform the first pressurization step through co-current blowdown by the third pressure equalization step of the second adsorption tower 112 of the hydrogen purification unit through the valves and pipes. To prevent ammonia contamination in the hydrogen purification unit, the second adsorption tower 122 of the guard bed unit performs the countercurrent blowdown step without the third pressure equalization step to vent with the second countercurrent blowdown valve 22 open.

After the third pressure equalization step, the second adsorption tower 112 of the hydrogen purification unit performs the countercurrent blowdown step with the second countercurrent blowdown valve 22-1 open. After the first pressurization step, the first adsorption tower 121 of the guard bed unit and the first adsorption tower 111 of the hydrogen purification unit perform the second pressurization step through co-current blowdown by the second pressure equalization step of the third adsorption tower 123 of the guard bed unit and the third adsorption tower 113 of the hydrogen purification unit, and perform through the pipe 107 with the first vacuum purge valve 16 closed and the first and third pressure equalization valves 15, 35 open.

The fourth adsorption tower 124 of the guard bed unit and the fourth adsorption tower 114 of the hydrogen purification unit perform the adsorption step, followed by co-current blowdown by the first pressure equalization step and the second pressure equalization step with the fourth raw material feed valve 41 closed, and in this instance, the fifth adsorption tower 125 of the guard bed unit and the fifth adsorption tower 115 of the hydrogen purification unit perform the adsorption step with the fifth raw material feed valve 51 open. With the first and fourth pressure equalization valves 15, 45 open, the fourth adsorption tower 124 of the guard bed unit and the fourth adsorption tower 114 of the hydrogen purification unit perform the first pressure equalization step to carry out co-current blowdown through the pipe 107, and the first adsorption tower 121 of the guard bed unit and the first adsorption tower 111 of the hydrogen purification unit perform the third pressurization step to carry out countercurrent pressurization.

After the first pressure equalization step, the fourth adsorption tower 124 of the guard bed unit and the fourth adsorption tower 114 of the hydrogen purification unit carry out co-current blowdown by the second pressure equalization step through the opening of the second and fourth pressure equalization valves 45, 25 and the pipe 107, and the second adsorption tower 122 of the guard bed unit and the second adsorption tower 112 of the hydrogen purification unit perform the second pressurization step in a countercurrent flow. After the countercurrent pressurization, the first adsorption tower 121 of the guard bed unit and the first adsorption tower 111 of the hydrogen purification unit perform the final pressurization step by product using the high purity hydrogen produced from the fifth adsorption tower 125 of the guard bed unit and the fifth adsorption tower 115 of the hydrogen purification unit. For the product pressurization, the pressurization valves 45, 25 are closed and the first pressurization valve 14 is open, and the final pressurization step by product is performed until the adsorption pressure. In this instance, the second adsorption tower 122 of the guard bed unit and the second adsorption tower 112 of the hydrogen purification unit perform the vacuum purge step and the first pressurization step among the steps in one cycle in a sequential order.

The third adsorption tower 123 of the guard bed unit and the third adsorption tower 113 of the hydrogen purification unit perform the purge providing step of providing necessary vacuum purge gas to the second adsorption tower 122 of the guard bed unit and the second adsorption tower 112 of the hydrogen purification unit through the pipe 106 with the second and third vacuum purge valves 26, 36 open, and perform vacuum desorption through the vacuum pump pipe 102 with the second countercurrent blowdown valve 22 open. After the vacuum purge step, the second adsorption tower 122 and the second adsorption tower 112 of the hydrogen purification unit perform the first pressurization step through co-current blowdown by the third pressure equalization step of the third adsorption tower 113 of the hydrogen purification unit through the valves and pipes.

To prevent contamination of ammonia in the hydrogen purification unit, the third adsorption tower 123 of the guard bed unit performs the countercurrent blowdown step without the third pressure equalization step to vent with the third countercurrent blowdown valve 32 open. After the third pressure equalization step, the third adsorption tower 113 of the hydrogen purification unit performs the countercurrent blowdown step with the third countercurrent blowdown valve 32-1 open. After the first pressurization step, the second adsorption tower 122 of the guard bed unit and the second adsorption tower 112 of the hydrogen purification unit perform the second pressurization step through co-current blowdown by the second pressure equalization step of the fourth adsorption tower 124 of the guard bed unit and the fourth adsorption tower 114 of the hydrogen purification unit, and perform through the pipe 107 with the second vacuum purge valve 26 closed and the second and fourth pressure equalization valves 25, 45 open.

After one cycle is completed, each adsorption tower 121~125 of the guard bed unit and each adsorption tower 111~115 of the hydrogen purification unit are continuously driven by performing the same process as one cycle, including the adsorption step, the first pressure equalization step, the second pressure equalization step, the purge providing step, the third pressure equalization step, the countercurrent blowdown step, the vacuum purge step, the first pressurization step, the second pressurization step, the third pressurization step and the final pressurization step by product.

As described above, the hydrogen purification method using the pressure swing adsorption apparatus 100 of the present disclosure may achieve high purity hydrogen purification by physical adsorption of impurities such as moisture ($H_2O$), ammonia ($NH_3$) and nitrogen ($N_2$) included in the mixed hydrogen gas produced after ammonia decomposition at or below trace levels, and improve selective adsorption for moisture, ammonia and nitrogen, thereby maximizing the hydrogen recovery rate and productivity. In addition, beginning inventory cost is low, and when only the pressure swing adsorption process is applied, a temperature swing adsorption process is not introduced, and thus it may be possible to eliminate the need for a heat source for regeneration, thereby reducing the driving cost.

Hereinafter, the present disclosure will be described in more detail based on an embodiment, but the present disclosure is not limited to the following embodiment.

Embodiment 1: Hydrogen Purification Using Pressure Swing Adsorption Apparatus 100 Including Five-Bed Guard Bed Unit and Hydrogen Purification Unit Adsorption Towers A process of purifying hydrogen from mixed gas containing 74.775 vol % of hydrogen, 24.925 vol % of nitrogen and 3,000 ppm of ammonia was performed using the pressure swing adsorption apparatus 100 including the guard bed unit in which five adsorption towers are arranged in parallel and the hydrogen purification unit in which five adsorption towers are arranged in parallel.

8 wt % of silica gel as the first adsorbent capable of adsorbing moisture was packed at the lower layer region of the first to fifth adsorption towers in the guard bed unit, and 15 wt % of activated carbon impregnated with 5 wt % of magnesium as the second adsorbent capable of adsorbing ammonia was packed at the upper layer region of the first to fifth adsorption towers to form a multilayer structure. Additionally, each of the first to fifth adsorption towers of the hydrogen purification unit was packed with zeolite CaX capable of adsorbing nitrogen. Additionally, the raw gas feed pressure was 5.5 atmospheric pressure. The process cycles of the guard bed unit and the hydrogen purification unit were equally maintained, and the pressure at the start of the countercurrent blowdown step of the guard bed unit and the hydrogen purification unit was 0.8 barg and 0.5 barg, respectively.

Each adsorption tower of the five-bed guard bed unit is continuously driven by performing the adsorption step, the first pressure equalization step, the second pressure equalization step, the purge providing step, the countercurrent blowdown step, the vacuum purge step, the first pressurization step, the second pressurization step, the third pressurization step and the final pressurization step by product, and each adsorption tower of the hydrogen purification unit is continuously driven by performing the adsorption step, the first pressure equalization step, the second pressure equalization step, the third pressure equalization step, the purge providing step, the countercurrent blowdown step, the vacuum purge step, the first pressurization step, the second pressurization step, the third pressurization step and the final pressurization step by product. In this instance, the raw gas throughput was 22.00 NL/min.

As result of measuring the hydrogen purified using the pressure swing adsorption apparatus 100, the purity of the purified hydrogen was 99.999%, and the hydrogen recovery rate was 86.7%.

Embodiment 2: Hydrogen Purification Using Pressure Swing Adsorption Apparatus 100-1 Including Six-Bed Guard Bed Unit and Hydrogen Purification Unit Adsorption Towers A process of purifying hydrogen from mixed gas containing 74.775 vol % of hydrogen, 24.925 vol % of nitrogen and 3,000 ppm of ammonia was performed using the pressure swing adsorption apparatus 100-1 including the guard bed unit in which six adsorption towers are arranged in parallel and the hydrogen purification unit in which six adsorption towers are arranged in parallel.

The lower layer region of the first to sixth adsorption towers in the guard bed unit was packed with 8 wt % of silica gel as the first adsorbent capable of adsorbing moisture, and the upper layer region of the first to sixth adsorption towers was packed with 15 wt % of activated carbon impregnated with 5 wt % of magnesium as the second adsorbent capable of adsorbing ammonia to form a multilayer structure. Additionally, each of the first to sixth adsorption towers of the hydrogen purification unit was packed with zeolite CaX capable of adsorbing nitrogen. Additionally, the raw gas feed pressure was 5.5 atmospheric pressure. The process cycles of the guard bed unit and the hydrogen purification unit were equally maintained, and the pressure at the start of the countercurrent blowdown step of the guard bed unit and the hydrogen purification unit was 0.8 barg and 0.5 barg, respectively.

Each adsorption tower GB1~GB6 of the six-bed guard bed unit is continuously driven by performing the adsorption step, the first pressure equalization step, the second pressure equalization step, the third pressure equalization step, the purge providing step, the countercurrent blowdown step, the vacuum purge step, the first pressurization step, the second pressurization step, the third pressurization step, the fourth pressurization step and the final pressurization step by product, and each adsorption tower 111~116 of the hydrogen purification unit is continuously driven by performing the adsorption step, the first pressure equalization step, the second pressure equalization step, the third pressure equalization step, the purge providing step, the fourth pressure equalization step, the countercurrent blowdown step, the vacuum purge step, the first pressurization step, the second pressurization step, the third pressurization step, the fourth pressurization step and the final pressurization step by product. In this instance, the raw gas throughput was 22.00 NL/min.

As a result of measuring hydrogen purified using the pressure swing adsorption apparatus 100-1, the purity of the purified hydrogen was 99.999%, and the hydrogen recovery rate was 87.414%.

Detailed Description of Main Elements

100, 100-1: Pressure swing adsorption apparatus
101: Raw material feed pipe
102~108: A plurality of pipes
111~116: First to sixth adsorption towers of hydrogen purification unit
121~126: First to sixth adsorption towers of guard bed unit
131: Vacuum pump
11, 21, 31, 41, 51, 61: First to sixth raw material feed valves
11-1, 21-1, 31-1, 41-1, 51-1, 61-1: Outlet valves of first to sixth guard bed units
12, 22, 32, 42, 52, 62: Countercurrent blowdown valves of first to sixth guard bed units
12-1, 22-1, 32-1, 42-1, 52-1, 62-1: Countercurrent blowdown valves of first to sixth hydrogen purification units
13, 23, 33, 43, 53, 63: First to sixth product production valves
14, 24, 34, 44, 54, 64: First to sixth pressurization valves

15, 25, 35, 45, 55, 65: First to sixth pressure equalization valves

16, 26, 36, 46, 56, 66: First to sixth vacuum purge valves

The invention claimed is:

1. A hydrogen purification method using a pressure swing adsorption apparatus, comprising:

providing the pressure swing adsorption apparatus comprising:

a raw material feed pipe for supplying a mixed hydrogen gas produced after ammonia decomposition;

a plurality of adsorption towers including a guard bed unit disposed at a lower position and a hydrogen purification unit disposed at an upper position;

a vacuum pump connected to the plurality of adsorption towers to maintain the plurality of adsorption towers under vacuum pressure; and a plurality of valves configured to open and close pipes connecting the plurality of adsorption towers and the vacuum pump, wherein each adsorption tower of the guard bed unit is packed with a first adsorbent and a second adsorbent arranged in layers to selectively remove moisture and ammonia, respectively, from the mixed hydrogen gas, wherein each adsorption tower of the hydrogen purification unit is packed with a third adsorbent to selectively remove nitrogen from the mixed hydrogen gas, and wherein during operation a lowest pressure reached in each adsorption tower of the guard bed unit is not less than one fourth of a raw material feed pressure;

feeding the mixed hydrogen gas produced after ammonia decomposition into an adsorption tower of the guard bed unit through the raw material feed pipe;

selectively adsorbing and removing moisture by allowing the fed mixed hydrogen gas to pass through the first adsorbent packed at a lower layer region of the adsorption tower in the guard bed unit;

selectively adsorbing and removing ammonia by allowing the mixed hydrogen gas free of moisture to pass through the second adsorbent packed at an upper layer region of the adsorption tower in the guard bed unit;

feeding the mixed hydrogen gas free of moisture and ammonia into an adsorption tower of the hydrogen purification unit; and selectively adsorbing and removing nitrogen by allowing the fed mixed hydrogen gas free of moisture and ammonia to pass through the third adsorbent packed in the adsorption tower in the hydrogen purification unit to acquire purified hydrogen.

2. The hydrogen purification method of claim 1, wherein the step of selectively adsorbing and removing ammonia reduces an amount of ammonia in the mixed hydrogen gas free of moisture to less than 0.1 ppm, and wherein the step of selectively adsorbing and removing nitrogen reduces an amount of nitrogen in the purified hydrogen to less than 10 ppm.

3. The hydrogen purification method of claim 1, wherein the guard bed unit comprises first through fifth adsorption towers, and the hydrogen purification unit comprises first through fifth adsorption towers, wherein the method further comprises:

operating each of the first through fifth adsorption towers of the guard bed unit to perform an adsorption step, a first pressure equalization step, a second pressure equalization step, a purge providing step, a countercurrent blowdown step, a vacuum purge step, a first pressurization step, a second pressurization step, and a final pressurization step by product in sequence; and operating each of the first through fifth adsorption towers of the hydrogen purification unit to perform an adsorption step, a first pressure equalization step, a second pressure equalization step, a purge providing step, a countercurrent blowdown step, a vacuum purge step, a first pressurization step, a second pressurization step, and a final pressurization step by product in sequence.

4. The hydrogen purification method of claim 3, further comprising:

regenerating the first adsorbent and the second adsorbent of an adsorption tower of the guard bed unit by supplying a tail gas emitted from an adsorption tower of the hydrogen purification unit as a purge gas to the adsorption tower of the guard bed unit after the countercurrent blowdown step.

5. The hydrogen purification method of claim 1, wherein the guard bed unit comprises first through sixth adsorption towers, and the hydrogen purification unit comprises first through sixth adsorption towers, wherein the method further comprises:

operating each of the first through sixth adsorption towers of the guard bed unit to perform an adsorption step, a first pressure equalization step, a second pressure equalization step, a third pressure equalization step, a purge providing step, a countercurrent blowdown step, a vacuum purge step, a first pressurization step, a second pressurization step, a third pressurization step, and a final pressurization step by product in sequence; and operating each of the first through sixth adsorption towers of the hydrogen purification unit to perform an adsorption step, a first pressure equalization step, a second pressure equalization step, a third pressure equalization step, a purge providing step, a countercurrent blowdown step, a vacuum purge step, a first pressurization step, a second pressurization step, a third pressurization step, and a final pressurization step by product in sequence.

* * * * *